Patented Dec. 20, 1938

2,140,550

UNITED STATES PATENT OFFICE 2,140,550

CHLORINATION OF BENZENE

John H. Reilly, Midland, Mich., assignor to The Dow Chemical Company, Midland, Mich., a corporation of Michigan No Drawing. Application February 11, 1938, Serial No. 190,132

6 Claims. (Cl. 260—650)

This invention relates to a method for the chlorination of benzene, and more particularly to a vapor phase process therefor.

According to present practice in the chlorination of benzene in the liquid phase there is obtained about a 50 per cent conversion of the benzene to chlorinated products in a single pass of the reactants through the system. The ratio of monochlorobenzene to higher substitution products varies somewhat, but it is common for the amount of polychlorobenzenes to constitute 20 per cent or more of the chlorinated product isolated after a single pass. Monochlorobenzene has been acquiring constantly greater importance industrially over the last few years owing to its employment not only as a solvent of major importance, but also because of the tremendous quantities of this material now employed as a reagent in the preparation of phenol, aniline, and other industrial chemicals. The increased demand for monochlorobenzene has far exceeded the growth in the market for the polychlorobenzenes. It is desirable, therefore, that there be provided, and it is accordingly an object of this invention to provide, a process whereby the proportion of monochlorobenzene relative to higher substitution products obtained in the direct chlorination of benzene may be maintained as high as possible while at the same time converting as large a proportion as possible of the original benzene to chlorination products in a single pass.

My improved process for the chlorination of benzene comprises the steps of passing benzene vapor and gaseous chlorine in certain preferred ratios into contact with molten metal chlorides at a temperature in the range between about 200° and about 400° C. The ratio of chlorine to benzene is preferably in the range from about 0.5 to about 1.0 part of the former per part of the latter, by weight. The theoretical ratio, to produce mono-substitution, is 0.91 part of chlorine per part of benzene, by weight. The benzene and chlorine may be preheated separately or in admixture to any desired temperature up to reaction temperature (and preferably between 100° and 200° C.) before they are passed into the molten salt bath.

The bath in which the reaction is carried out comprises one or more of the chlorides of aluminum, potassium, iron, sodium, bismuth, zinc, or other metals, provided that such chloride or mixture of chlorides are fluid at the reaction temperature. The eutectic mixture of 60 parts of aluminum chloride, 30 parts of sodium chloride, and 10 parts of ferric chloride by weight is especially suitable since it has a melting point of about 150° C. and a boiling point above 1000° C. Another satisfactory salt bath comprises 30 parts of sodium chloride and 70 parts of aluminum chloride by weight. Zinc chloride can be used alone as the reaction medium.

Owing to the heat generated in the chlorination of benzene, it is seldom necessary to employ an external source of heat after the reaction has started. It may become necessary, in fact, to cool the reaction vessel when high rates of flow of the reactants are employed.

The following examples illustrate the practice of my invention:

Example 1

A mixture of benzene and chlorine in the ratio of approximately 0.6 part of chlorine per part of benzene was passed at a steady rate into a bath consisting of the eutectic mixture of aluminum chloride, sodium chloride, and ferric chloride at a temperature between 230° and 240° C. To minimize the exothermic reaction, the chlorine employed was diluted with an equal volume of nitrogen. Other experiments have shown that carbon dioxide or hydrogen chloride can be as readily employed as the diluent. The rate of flow of reactants into the bath was about 18 grams of benzene and 10.8 grams of chlorine per minute. The reagents were released 3 inches under the surface of the bath, from which the reaction products flashed as vapor, were collected, condensed, and subsequently separated by fractional distillation. The chlorinated product consisted principally of monochlorobenzene boiling at about 132° C., which was obtained in a yield of over 82 per cent, based on the chlorine employed. There was only 10 to 12 per cent of higher chlorides formed.

Example 2

Benzene at a rate of about 18 grams per minute was released from a nozzle 6 inches under the surface of a fused salt bath of the same composition as employed in the preceding example and maintained at a temperature in the range from about 360° to about 365° C. Chlorine supplied through a separate inlet tube was released at the same depth in the bath at a point adjacent to that at which the benzene vapor was released, the chlorine supply nozzle being directed toward the benzene nozzle, to effect mixing. The ratio of reactants was 0.89 part of chlorine per part of benzene. The products recovered from the reaction were condensed, washed to remove hydrogen chloride, dried, and distilled. There was obtained 23.5 per cent of benzene, 61.5 per cent of monochlorobenzene, and 15 per cent of dichlorobenzenes, by weight. The ratio of mono- to dichlorides, when calculated on a molecular basis, becomes 0.55 mole of monochlorobenzene to each 0.1 mole of dichlorobenzene. It follows, therefore, that 84.5 mole-per cent of the chlorinated benzene is in the form of the monochloro- derivative. Similarly, on a molecular basis it is determined that 68 per cent of the benzene passing through the reactor was chlorinated on the first pass. This is considerably better than the average experience in the liquid phase chlorination reactions.

*Example 3*

In a manner analogous to that set forth in the preceding examples, benzene vapor preheated to 145° C. and chlorine diluted with an equal volume of nitrogen were passed through separate pipes which extended approximately 3¾ inches under the surface of a bath consisting of 30 parts of sodium chloride and 70 parts of aluminum chloride by weight. The two inlet pipes entered the bath parallel but at a slight distance apart. The end of each pipe was capped and there was a horizontal slot provided in the wall of each pipe, said slots facing one another so that the benzene vapors and chlorine gas diluted with an equal volume of nitrogen were mixed under the surface of the bath. The bath was maintained at a temperature between 290° and 310° C. Over a given period of time 4.9 moles of benzene and 2.75 moles of chlorine were passed through the system. The reaction products flashed from the bath were collected, freed from acidity, and distilled. There was produced about 0.11 part by weight of higher chlorides for each part of monochlorobenzene. Based upon the amount of chlorine used (the reagent present in least molecular quantity) the reaction was about 88 per cent efficient. When operated on a larger scale and with the benzene and chlorine tubes leading to a greater depth in the reactor, an even higher efficiency was obtained.

I have found that, other conditions being kept constant, the lower the operating temperature (down to about 200° or 225° C.) or the shorter the contact time between the benzene and the chlorine in the fused metal chloride bath, the greater is the proportion of mono- to higher chlorides obtained in a single pass through the system. When too great a proportion of benzene is employed, or when inadequate contact time is permitted between the benzene and chlorine, the conversion of benzene to its chlorinated derivatives drops off, even though the proportion of mono- to higher chlorides may approach the theoretical limit.

Other modes of applying the principle of my invention may be employed instead of the one explained, change being made as regards the process herein disclosed, provided the step or steps stated by any of the following claims or the equivalent of such stated step or steps be employed.

I therefore particularly point out and distinctly claim as my invention:—

1. The process which comprises reacting chlorine with benzene in contact with molten metal chlorides at a temperature between 200° and 400° C.

2. In a process for the preparation of monochlorobenzene, the step which consists in passing chlorine and benzene in the ratio of between about 0.5 and about 1.0 part by weight of chlorine per part of benzene into contact with one another under the surface of a molten metal chloride bath maintained at a temperature between 200° and 400° C.

3. In a process for the preferential preparation of monochlorobenzene, the step which consists in passing a mixture of chlorine and benzene vapor in the ratio of between about 0.5 and 1.0 part by weight of chlorine per part of benzene into a molten metal chloride bath maintained at a temperature between 200° and 400° C.

4. The process which comprises preheating benzene to a temperature not substantially above 200° C., admixing chlorine therewith in the ratio between about 0.5 and about 1.0 part by weight of chlorine per part of benzene, and passing said mixture into a molten metal chloride bath maintained at a temperature between 200° and 400° C.

5. The process which comprises diluting chlorine with a gas inert under reaction conditions and passing the so-formed gaseous mixture and benzene in a ratio of between about 0.5 and about 1.0 part by weight of chlorine per part of benzene into contact with one another under the surface of a molten metal chloride bath maintained at a temperature between 200° and 400° C.

6. The process which comprises diluting chlorine with nitrogen and passing the so-formed gaseous mixture and benzene in a ratio of between about 0.5 and about 1.0 part by weight of chlorine per part of benzene into contact with one another under the surface of a molten metal chloride bath maintained at a temperature between 200° and 400° C.

JOHN H. REILLY.